Patented Aug. 6, 1974

3,828,047
PHENOXYETHYL N-PHENYL-N-PHENOXYETHYL-PIPERAZINYLETHYLCARBAMATE
Franklin W. Abbate, North Haven, and William J. Farrissey, Jr., Northford, Conn., assignors to The Upjohn Company, Kalamazoo, Mich.
No Drawing. Original application Mar. 2, 1970, Ser. No. 15,925, now Patent No. 3,719,680, dated Mar. 6, 1973. Divided and this application Dec. 13, 1972, Ser. No. 314,610
Int. Cl. C07d 51/70
U.S. Cl. 260—268 R       1 Claim

ABSTRACT OF THE DISCLOSURE

Phenoxyethyl N - phenyl-N-phenoxyethylpiperazinylethylcarbamate is prepared in good yield by reacting at an elevated temperature an appropriate N-hydrocarbylcarbamate with triethylenediamine or an N-hydrocarbylcarbamate, triethylenediamine. The N-piperazinyl derivative so-formed is useful as catalysts in the manufacture of polyurethanes, in the preparation of acid-soluble and acid-dyeable polyurethanes.

CROSS REFERENCE TO RELATED APPLICATIONS

This is a division of application Ser. No. 15,925, filed Mar. 2, 1970, now U.S. Pat. No. 3,719,680, issued Mar. 6, 1973.

BACKGROUND OF THE INVENTION (1) Field of the Invention

This invention relates to a novel N-(piperazinylethyl) carbamate and to a method for its preparation and relates particularly to phenoxyethyl N-phenyl-N-phenoxyethyl-piperazinylethylcarbamate synthesized by reacting at an elevated temperature the appropriate N-hydrocarbylcarbamate with triethylenediamine.

(2) Description of the Prior Art

The only work previously described in the art in which triethylenediamine has been employed as a reactant to give a piperazine derivative is that of Ross et al., JACS, 85, 3999 (1963) who reacted 2,4-dinitrochlorobenzene with triethylenediamine to form the compound:

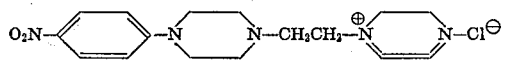

SUMMARY OF THE INVENTION

The present invention comprises a novel compound of the formula:

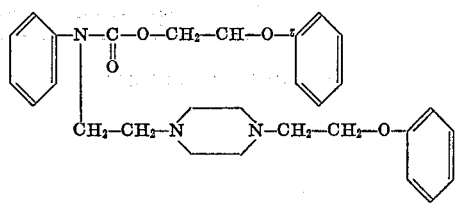

The novel piperazine derivative of this invention can be utilized as a catalyst in preparing valuable polyurethane products, in the preparation of acid-dyeable modified polyesters and for the modification of polyurethanes prepared from a polyester polyol and a polyisocyanate to yield acid-dyeable or acid-soluble polymers.

A wide variety of catalysts are employed in the preparation of polyurethanes and especially in preparing polyurethane foams by the reaction of polyisocyanates with polyols in the presence of a fluorocarbon foaming agent. One of the most important of these catalysts is triethylenediamine which is employed in substantial quantities in the urethane industry in foam preparation as well as in the manufacture of other urethane products. It has been found that the novel N-(piperazinylethyl)-carbamates of this invention are valuable urethane catalysts which may be employed as a substitute for a part or all of the triethylenediamine commonly utilized in the production of polyurethanes by interaction of diisocyanates and polyols or in the production of polyureas by interaction of diisocyanates and polyamines. Methods for producing such polyurethanes and polyureas in the form of film, fibers and foams utilizing the conventionally employed diisocyanates and polyols together with the novel catalysts of this invention will be readily apparent to those skilled in the art. Conventional procedures for the synthesis of such polyurethanes are described by Saunders et al., Polyurethanes, Chemistry and Technology, part II, Interscience Publishers, 1964, pp. 299–451.

Examples of art-recognized polyols which can be employed alone, or as mixtures, in preparing polyurethanes include the following:

(1) aliphatic diols, such as ethylene glycol, 1,2-propylene glycol, 1,4-butanediol, 1,2-hexanediol, 1,5-pentanediol, 1,2-hexanediol, etc.;
(2) aliphatic triols, such as trimethylolmethane, trimethylolethane, 1,2,3-hexanetriol, 1,1,1-trimethylolhexane, etc.;
(3) aliphatic tetrols, such as erythritol, pentaerythritol, etc.;
(4) aliphatic pentols, such as arabitol, xylitol, etc.;
(5) aliphatic hexols, such as mannitol, sorbitol, dipentaerythritol, etc.;
(6) aniline-alkylene oxide diol adducts;

and adducts prepared by reacting any of the above-named compounds (1) through (5) above with one or more molar proportions of ethylene oxide, propylene oxide, 1,2-butylene oxide, or mixtures thereof.

Any of the prior art polyisocyanates can be used as reactants in preparing polyurethane products when utilizing the novel product of this invention as catalyst e.g., 2,4-tolylene diisocyanate, 2,6 - tolylene diisocyanate, 4,4-diphenylmethane diisocyanate, dianisidine diisocyanate, tolidine diisocyanate, hexamethylene diisocyanate, m-xylene diisocyanate, 1,5-naphthalene diisocyanate, and other di- and higher polyisocyanates such as those listed in the table of Siefken, Ann., 562, 122–135 (1949). Preferred polyisocyanates, however, are products obtained by phosgenation of mixtures of methylene-bridged polyphenyl polyamines obtained by the interaction of formaldehyde, hydrochloric acid, and primary aromatic amines, for example, aniline, o-chloroaniline, o-toluidine, or mixtures thereof. Such polyisocyanates are known in the art, e.g., U.S. Pat. Nos. 2,683,730; 2,950,263; and 3,012,008; Canadian Pat. No. 665,494; and German specification 1,131,877.

In preparing polyurethane products employing the novel N-(piperazinylethyl)-carbamates of this invention as catalysts, or as a part of the catalyst mixture, by reaction of any of the polyisocyanates conventionally employed in the art with the available polyols, blowing agents, surfactants cell-openers and the like adjuvants commonly employed for the production of polyurethane products may be used. If desired, special polyols such as the phosphorus-containing polyols can be incorporated in the polyurethane reaction mixture in order to impart fire retardant properties to the resulting foam. Examples of such phosphorus-containing polyols are the tris polypropylene glycol phosphates produced by interaction of phosphoric and propylene oxide as, for example, described in U.S. Pats. Nos. 2,372,244 and 3,094,549.

DETAILED DESCRIPTION OF THE INVENTION

The novel N-(piperazinylethyl)-carbamate of this invention is obtained by reacting at an elevated temperature phenoxyethyl N-phenylcarbamate with triethylenediamine.

The process and product thereof can be illustratively represented as follows:

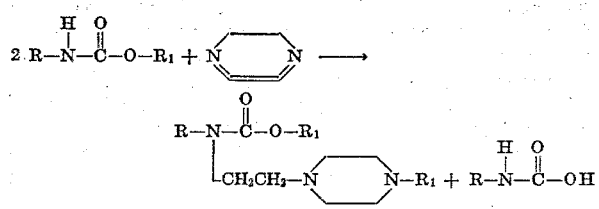

wherein R is phenyl and $R_1$ is phenoxyethyl.

In conducting the foregoing process, the N-hydrocarbylcarbamate employed as a starting material is preferably reacted with triethylenediamine in the presence of an inert organic solvent. The inert organic solvent can be any organic solvent which is inert under the conditions of the reaction, e.g., does not enter into reaction with any of the reactants employed or in any way interfere with the progress of the reaction. Suitable inert organic solvents include benzene, toluene, xylene, naphthalene, Decalin, chlorobenzene, o - dichlorobenzene, bromobenzene, etc.

Advantageously, processes (a) and (b) are conducted at a temperature ranging from about 80° to about 300° C. and preferably at a temperature within the range of about 125° C. to about 200° C. Approximately stoichiometric quantities of the reactants are generally employed in the process although if desired, an excess of the carbamate can be utilized. The progress of the conversion of the N-hydrocarbylcarbamate to the desired piperazine derivative can be followed by any of the appropriate analytical techniques such as infrared spectrographic analysis, etc. The desired N-(piperazinylethyl)-carbamate can be isolated from the reaction mixture by conventional procedures in organic chemical operations such as by extraction, distillation, precipitation as the hydrochloric acid salt, etc.

The phenoxyethyl N-phenylcarbamate utilized as a starting material is a known compound which can be prepared by methods conventional in the art for the preparation of N-substituted carbamates. A particularly convenient method involves the reaction of the appropriate chloroformate and appropriate hydrocarbylamine; see for example, H. von Pechmann, Ber., 28, 855 (1895), for a description of the preparation of ethyl N-methylcarbamate from methylamine and ethyl chloroformate as representative of the conditions required in preparing this compound. Another method for the preparation of the N-substituted carbamate involves the reaction of the corresponding N-substituted carbamyl halide with the appropriate alcohol for example, using the procedure described by Gattermann, Annalen, 244, 30 (1888) for the reaction of carbamyl chloride itself with alcohols.

N-substituted carbamates can also be obtained by the alkylation of olefins with urethane (ethyl carbamate) as described by Mueller and Merten, Ber., 98, 1097 (1965) and by condensation of aldehydes with alkyl carbamates as described, for instance, by Bischoff, Ber., 7, 628 (1874).

A preferred embodiment of this invention is illustrated by the following example which is to be considered not limitative.

A total of 11.02 g. of phenoxyethyl N-phenylcarbamate and 3.0 g. of triethylenediamine were refluxed in 100 ml. of chlorobenzene for 6 hours.

Following dilution of the reaction mixture with ether, it was extracted with four portions of hydrochloric acid (5 percent by volume) and finally with water. In the next step the resulting aqueous acid layer was washed with two portions of ether. The organic layers were combined, washed with a saturated salt solution and finally dried over magnesium sulfate and after evaporation of the ether, residue containing the unreacted starting carbamate was obtained.

The acid aqueous layer was made basic through the addition of sodium hydroxide (10 percent by volume), saturated with sodium chloride and then extracted with five portions of ether. After the ether phase had been washed to neutrality with a saturated salt solution, it was dried over magnesium sulfate and on evaporation there was recovered in good yield the compound having the formula:

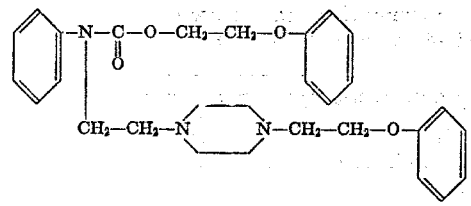

The foregoing product was identified by infrared spectrographic and vapor phase chromatographic analyses.

Highly useful polyurethane foams can be prepared in which the novel N-(piperazinylethyl)-carbamate of this invention is employed as a catalyst. The preparation of typical foam products using the catalyst is illustrated in the aforesaid U.S. Pat. No. 3,719,680.

What is claimed is:
1. A compound of the formula:

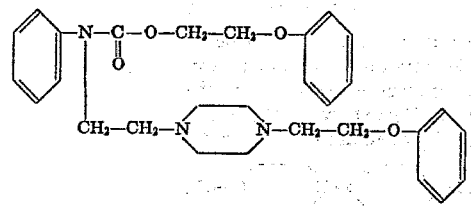

References Cited

UNITED STATES PATENTS

| | | | |
|---|---|---|---|
| 3,121,213 | 4/1964 | Surrey | 260—268 R |
| 3,719,680 | 3/1973 | Abbate et al. | 260—268 R |
| 3,721,674 | 3/1973 | Abbate et al. | 260—268 R |

DONALD G. DAUS, Primary Examiner

UNITED STATES PATENT OFFICE
CERTIFICATE OF CORRECTION

Patent No. 3,828,047　　　　　　　　　Dated August 6, 1974

Inventor(s) Franklin W. Abbate and William J. Farrissey, Jr.

It is certified that error appears in the above-identified patent and that said Letters Patent are hereby corrected as shown below:

Col. 1, lines 18 and 19:

triethylenediamine or an
N-hydrocarbylcarbamate, tri-
ethylenediamine.  The N-
piperazinyl Should read:

triethylenediamine.
The N-piperazinyl

Col. 1, lines 53 - 60:

Should read:

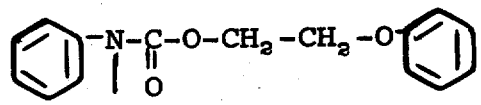

Col. 2, line 56:

Patent No. 665,494

Should read:

Patent No. 665,495

Signed and sealed this 19th day of November 1974.

(SEAL)
Attest:

McCOY M. GIBSON JR.
Attesting Officer

C. MARSHALL DANN
Commissioner of Patents